US012013469B2

(12) United States Patent
Cronie

(10) Patent No.: US 12,013,469 B2
(45) Date of Patent: Jun. 18, 2024

(54) SENSOR PRIVACY MANAGEMENT

(71) Applicant: Nokia Technologies Oy, Espoo (FI)

(72) Inventor: Harm Cronie, Echallens (CH)

(73) Assignee: NOKIA TECHNOLOGIES OY, Espoo (FI)

( * ) Notice: Subject to any disclaimer, the term of this patent is extended or adjusted under 35 U.S.C. 154(b) by 932 days.

(21) Appl. No.: 16/945,201

(22) Filed: Jul. 31, 2020

(65) Prior Publication Data
US 2021/0048538 A1 Feb. 18, 2021

(30) Foreign Application Priority Data

Aug. 13, 2019 (EP) ..................................... 19191433

(51) Int. Cl.
*G01S 19/26* (2010.01)
*G06N 20/00* (2019.01)
*H04W 48/16* (2009.01)

(52) U.S. Cl.
CPC .............. *G01S 19/26* (2013.01); *G06N 20/00* (2019.01); *H04W 48/16* (2013.01)

(58) Field of Classification Search
None
See application file for complete search history.

(56) References Cited

U.S. PATENT DOCUMENTS

| 5,786,790 | A | * | 7/1998 | Abbott | ...................... | G01S 19/41 |
| | | | | | | 701/470 |
| 8,310,394 | B2 | * | 11/2012 | Kim | ................... | H04W 52/0261 |
| | | | | | | 342/357.31 |
| 9,344,990 | B1 | * | 5/2016 | Bali | ....................... | H04W 4/029 |
| 9,696,431 | B2 | * | 7/2017 | Wirola | ..................... | G01S 19/43 |
| 2005/0038601 | A1 | * | 2/2005 | Dentinger | ............... | G01S 19/25 |
| | | | | | | 701/470 |
| 2009/0191892 | A1 | * | 7/2009 | Kelley | .................. | H04W 48/20 |
| | | | | | | 455/456.1 |
| 2009/0219209 | A1 | * | 9/2009 | Bush | ....................... | G01S 5/019 |
| | | | | | | 342/357.77 |

(Continued)

FOREIGN PATENT DOCUMENTS

WO        WO2019/149957 A1 *  8/2019  ............. G01S 5/019

OTHER PUBLICATIONS

"Fitness tracking app Strava gives away location of secret US army bases", The Guardian, Retrieved on Jun. 24, 2020, Webpage available at : https://www.theguardian.com/world/2018/jan/28/fitness-tracking-app-gives-away-location-of-secret-us-army-bases.

(Continued)

*Primary Examiner* — Bernarr E Gregory
(74) *Attorney, Agent, or Firm* — ALSTON & BIRD LLP

(57) ABSTRACT

According to an example aspect of the present invention, there is provided an apparatus comprising a memory configured to store a sensor management dataset, and at least one processing core, configured to process an instruction to limit an accuracy of a first sensor in accordance with a resolution requirement of a property measured by the first sensor, determine, using the sensor management dataset, at least one second sensor which is capable of estimating the property, and cause lowering of resolution of data produced by the at least one second sensor, the extent of resolution lowering being determined based on first resolution requirement and the sensor management dataset.

19 Claims, 5 Drawing Sheets

(56) References Cited

U.S. PATENT DOCUMENTS

| | | | | |
|---|---|---|---|---|
| 2009/0289845 | A1* | 11/2009 | Gum | G01S 19/26 342/357.31 |
| 2011/0128824 | A1* | 6/2011 | Downey | G01S 19/26 368/14 |
| 2013/0018581 | A1* | 1/2013 | Sidhu | G01S 19/26 701/469 |
| 2013/0185804 | A1* | 7/2013 | Biswas | G06F 21/577 726/26 |
| 2017/0165526 | A1* | 6/2017 | Bakun | G01S 19/19 |
| 2017/0169242 | A1 | 6/2017 | Yu et al. | |

OTHER PUBLICATIONS

"How GPS can track you, even when you turn it off", The Guardian, Retrieved on Jun. 24, 2020, Webpage available at : https://www.cnbc.com/2018/07/13/gps-can-spy-on-you-even-when-you-turn-it-off.html.

"Hackers transform a smartphone gyroscope into an always-on microphone", Engadget, Retrieved on Jun. 24, 2020, Webpage available at : https://www.engadget.com/2014-08-15-gyrophone-eavesdropping-hack.html.

Laput et al., "Synthetic Sensors: Towards General-Purpose Sensing", Proceedings of the 2017 CHI Conference on Human Factors in Computing Systems, May 6-11, 2017, 14 pages.

"Smartphone Accelerometers Can Be Fooled by Sound Waves", IEEE Spectrum, Retrieved on Jun. 24, 2020, Webpage available at : https://spectrum.ieee.org/tech-talk/telecom/security/smartphone-accelerometers-can-be-fooled-by-sound-waves.

Extended European Search Report received for corresponding European Patent Application No. 19191433.2, dated Dec. 5, 2019, 8 pages.

Doan et al., "Location Obfuscation Framework for Training-Free Localization System", International Conference on Information Systems Security, 2014, pp. 464-476.

Office action received for corresponding European Patent Application No. 19191433.2, dated Jun. 24, 2022, 7 pages.

Intention to Grant for European Application No. 19191433.2 dated Jan. 22, 2024, 7 pages.

* cited by examiner

SENSOR PRIVACY MANAGEMENT

FIELD

The present disclosure relates to management of privacy aspects relating to sensor data.

BACKGROUND

User devices may be furnished with plural sensors, which are enabled to produce sensor data indicating values of a property corresponding to the sensor. For example, temperature is a property that a temperature sensor measures, and video is a property that a video-enabled camera sensor captures.

Users may carry user devices with them during the day, which creates a need to manage access to sensor data produced by sensors of user devices, since unlimited access to such sensor data would create privacy risks which the user may choose to avoid, or avoiding which are necessary for the safety of the user. For example, it may be possible to determine, from a location sensor's sensor data where a user has been during the day, unless access to such sensor data is controlled.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising a memory configured to store a sensor management dataset, and at least one processing core, configured to process an instruction to limit an accuracy of a first sensor in accordance with a resolution requirement of a property measured by the first sensor, determine, using the sensor management dataset, at least one second sensor which is capable of estimating the property, and cause lowering of resolution of data produced by the at least one second sensor, the extent of resolution lowering being determined based on first resolution requirement and the sensor management dataset.

According to a second aspect of the present disclosure, there is provided a method comprising processing an instruction to limit an accuracy of a first sensor in accordance with a resolution requirement of a property measured by the first sensor, determining, using a sensor management dataset, at least one second sensor which is capable of estimating the property, and causing lowering of resolution of data produced by the at least one second sensor, the extent of resolution lowering being determined based on the resolution requirement and the sensor management dataset.

According to a third aspect of the present disclosure, there is provided an apparatus comprising means for processing an instruction to limit an accuracy of a first sensor in accordance with a resolution requirement of a property measured by the first sensor, determining, using a sensor management dataset, at least one second sensor which is capable of estimating the property, and causing lowering of resolution of data produced by the at least one second sensor, the extent of resolution lowering being determined based on the resolution requirement and the sensor management dataset.

According to a fourth aspect of the present disclosure, there is provided a non-transitory computer readable medium having stored thereon a set of computer readable instructions that, when executed by at least one processor, cause an apparatus to perform at least processing an instruction to limit an accuracy of a first sensor in accordance with a resolution requirement of a property measured by the first sensor, determining, using a sensor management dataset, at least one second sensor which is capable of estimating the property, and causing lowering of resolution of data produced by the at least one second sensor, the extent of resolution lowering being determined based on the resolution requirement and the sensor management dataset.

EMBODIMENTS

In accordance with the present disclosure, a device may respond to an instruction to limit an accuracy of a first sensor by limiting the resolution, or resolutions, of at least one second sensor. This provides the beneficial effect, that the increase in privacy sought by limiting the accuracy of the first sensor is really obtained, and the limitation applied to the accuracy of the first sensor cannot be circumvented by using the at least one second sensor, in the event the property measured by the first sensor may be measured, or inferred, from sensor data produced by the at least one second sensor. The at least one second sensor may be determined from an identity of the first sensor with reference to a sensor management dataset, which may be pre-configured or produced or modified using a machine learning mechanism, for example. Likewise, an extent of resolution limitation to be applied to each of the at least one second sensor may be determined with reference to both the sensor management dataset and the extent to which the accuracy of the first sensor is to be limited.

Figure 1:
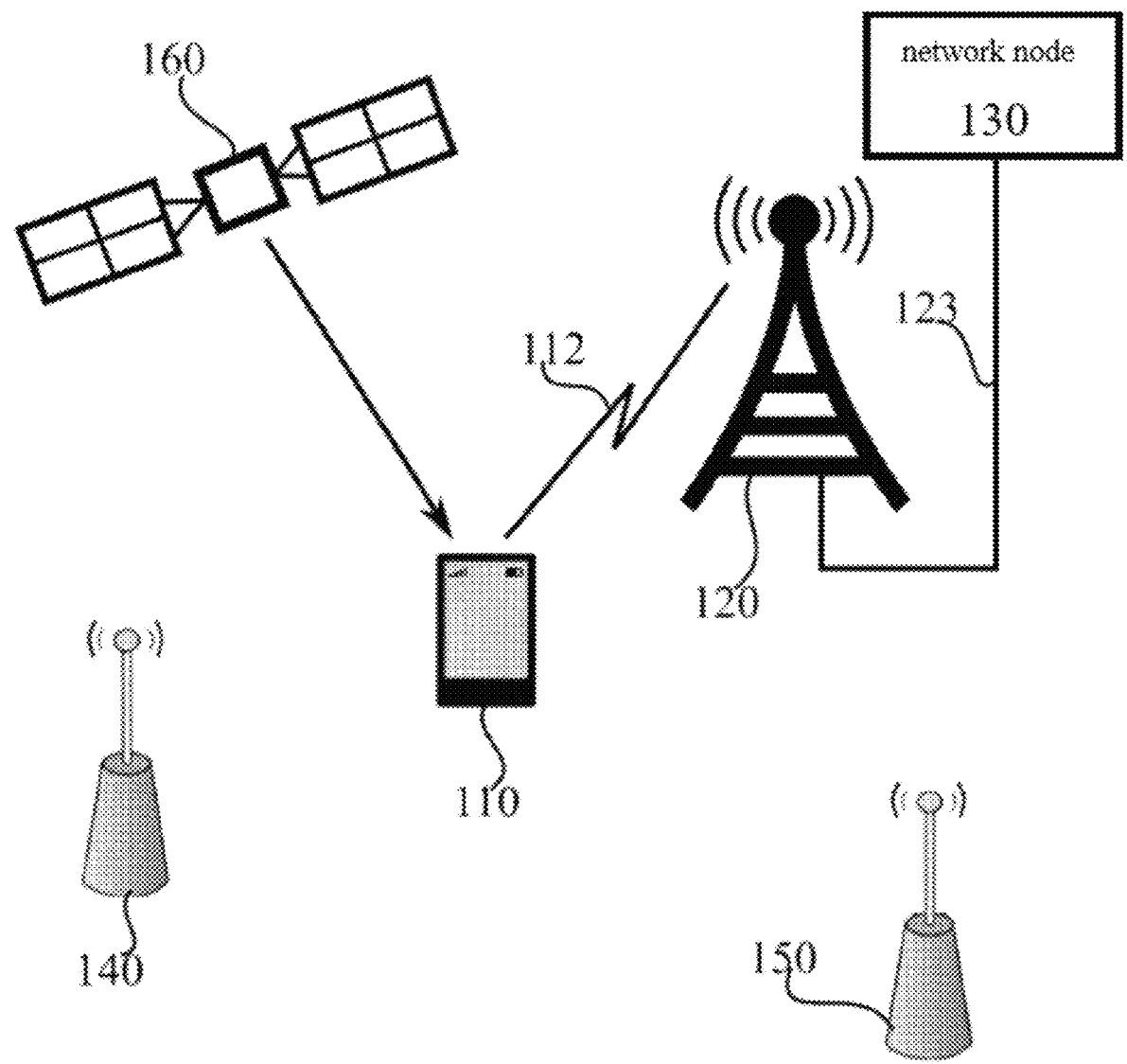
FIG. 1 illustrates an example system in accordance with at least some embodiments of the present invention.

FIG. 1 illustrates an example system in accordance with at least some embodiments of the present invention. Illustrated is mobile device 110, which will be herein referred to as a mobile 110 for brevity. Mobile 110 may comprise, for example, a user equipment of a cellular communication system, an Internet of Things node, an automobile control device, a smart watch, an item of smart jewellery or an augmented reality headset, for example. In general, mobile 110 comprises a device which comprises plural sensors, each sensor being enabled to measure a property, such as acceleration, rotation, sound, temperature or location of mobile 110, for example. In some embodiments device 110 is in fact not a mobile device, where the sensor suite of the device does not then need to comprise a location sensor, but comprises a microphone configured to record sound, for example. In the following this device will, however, be referred to as mobile 110 to assist in understanding principles underlying the present disclosure.

In the example of FIG. 1, mobile 110 is a smartphone, which is configured to communicate via base node 120 over wireless link 112. Base node 120 may be interfaced with a network node 130 via connection 123. Base node 120 and mobile 110 are here enabled to interoperate using a suitable cellular communication standard, such as long term evolution, LTE, or fifth generation, 5G, which is also known as new radio, NR. Wireless link 112 may have an uplink for conveying information from mobile 110 to base node 120, and/or a downlink for conveying information from base node 120 to mobile 110. The cellular communication system in which base node 120 and network node 130 are comprised in may be capable of determining a location of mobile 110, for example, mobile 110 may request, and responsively be provided with, an estimate of the location of mobile 110. The system may determine the location by triangulation and/or time distance of arrival, TDOA, mechanisms, for example.

Further, in the example of FIG. 1, mobile 110 is enabled to detect wireless local area network, WLAN, access points 140 and 150. WLAN access points, or similar local area network access points, may have access point names. In the case of WLAN access points, these access point names are known as service set identities, SSIDs. Mobile 110 may be able to determine an estimate of its location by collecting a set of access point names detectable from its present location. If locations of access points associated with the detected access point names are known, a location estimate for mobile 110 may be determined as a location, where the set of access point names detected may all be detectable.

Further, in the example of FIG. 1, mobile 110 is equipped with a satellite positioning receiver. This receiver is configured to receive signals from at least one satellite positioning constellation, such as global positioning system, GPS, GLONASS or the Galileo satellite constellation. Only one satellite 160 is illustrated in FIG. 1 for the sake of clarity, although as the skilled person knows such satellite constellations may comprise dozens of satellites. Mobile 110 may determine an estimate of its location based on receiving signals from the at least one satellite constellation. Such a location estimate may be expressed as geo-coordinates, for example.

Mobile 110 may receive, for example from a user, or a cellular operator, an instruction to limit an accuracy of a first sensor of mobile 110. For example, the instruction may relate to limiting an accuracy at which geo-coordinates are recorded from the satellite positioning receiver, or an accuracy at which sound is recorded by a microphone of mobile 110.

In general the instruction may relate directly to the property being measured, for example location or sound, in which case the instruction is determined to relate to the sensor primarily used to measure the property in question. Thus an instruction to the effect location should be recorded less accurately may be seen as an instruction to limit accuracy of the satellite positioning receiver, or an instruction to the effect sound recording accuracy should be limited may be seen as an instruction to limit accuracy of the microphone.

As one tangible example, the instruction may limit the accuracy of the satellite positioning receiver to a granularity of 500 meters or one kilometre, for example. As another example, the accuracy of the microphone may be limited by reducing the sensitivity, to eliminate lower sound levels from recorded speech. Eliminating the lower sound levels would have the effect of no longer recording speech more than a few meters away from mobile 110. The limitation may take the form of a resolution requirement, for example the afore-mentioned 500 meters or one kilometre, or a sound-level limit in the case of the microphone data. The resolution requirement may specify a resolution limit to be applied to sensor data generated by the first sensor.

An accuracy of sensor data may be limited in accordance with the resolution requirement by quantizing the sensor data, and/or by adding noise to the data produced sensor data. The extent of quantization, and/or the amplitude of the added noise, may be selected in dependence of the resolution requirement, to achieve the intended limitation in accuracy.

In addition to the primary sensor used to measure the property in question, it is possible that mobile 110 has at least one second sensor which is usable in measuring, or at least inferring, the same property. For example, while a satellite positioning receiver may be a primary sensor used in determining a location of mobile 110, the location may be measured also in other ways, such as by requesting from the cellular network, where mobile 110 is cellular-enabled. A location may be inferred from sensor data of sensors not configured to measure location, such as from acceleration sensor data, from gyroscope sensor data, or from the set of detectable access point names. In some cases, the property primarily measured by the first sensor may be inferred from at least two of the second sensors when their sensor data is taken together, but not in isolation of each other. Likewise, while the microphone may be the primary sensor for recording sound, some aspects of sound may be inferred from accelerometer sensor data. Some events are multi-sensorial in nature, for example a lightning strike may be primarily determined using a microphone based on its loud sound, but the same lightning strike is also detectable from its flash, observable with a camera sensor. Thus a second sensor may be capable of estimating the property, either by measuring it in case the sensor is configured to measure the property, or by inferring it in case the second sensor is not configured to measure the property, but is configured to measure a related property.

A sensor management dataset may be used to determine at least one second sensor which is usable in estimating the property which is affected by the instruction to limit the accuracy of the first sensor. In detail, the sensor management dataset may comprise a mapping from a set of first sensors to sets of at least one second sensor, that is, a set of one-to-one and/or one-to-many associations which enable determining one or more second sensors, from an identity of the first sensor. In the location example above, the mapping may be a mapping from the satellite positioning receiver to a group comprising the cellular communication system location query process, the acceleration sensor, the gyroscope, and the set of detectable access point names from the WLAN transceiver.

Resolutions of the determined at least one second sensor, or at least a subset of them in case there are more than one, may be lowered to enforce the privacy restriction applied to the first sensor as a response to the instruction. An extent of resolution lowering in the at least one second sensor may be determined based on the resolution requirement relating to the first sensor and the sensor management dataset. In detail, the sensor management dataset may enable determining, for each resolution requirement relating to the first sensor, an extent to which resolution(s) of the second sensor(s) must be reduced, so that the second sensor(s) cannot be used to obtain a value of the property primarily measured by the first sensor, which would be more accurate than the resolution requirement relating to the first sensor.

The resolution of the at least one second sensor may be lowered by the amount determined using the sensor management dataset, to obtain confidence the privacy requirement relating to the first sensor will be respected in the multi-sensor device 110. This lowering may be achieved using quantizing or noise addition, as was the case for the first sensor.

Where the at least one second sensor comprises a wireless local area network receiver, mobile 110 or another node performing the method may be configured to cause the lowering of resolution by adding access point names not detected to a set of access point names detected by the wireless local area network receiver. In terms of FIG. 1, mobile 110 may be configured to compile a set of detected access points by adding access point names other than the names of access points 140 and 150 to the set of detected access point names. This has the effect of making a location determining process based on the detected access points less precise, since the added access point names are names of access points further away than access points 140 and 150. Thus the area where mobile 110 may be seems larger, as it would cover also areas nearer these further access points. The access point names to be added to the set may be obtained from historical information, or a database of access points and their locations, such that access point names of access points near the actually detected access points are added to the set. A number of access point names not factually detected that are to be added to the set of detected access point names may be determined based on the resolution requirement relating to the first sensor and the sensor management dataset. The less accurate the allowed location information, the more access point names may be added to the set, to correspondingly lower the location determination resolution of the local area wireless network receiver of mobile 110.

Alternatively to adding non-detected access point names to the set of detected access point names, a precise location determination based on the set of detected access point names may be prevented by blanking the set of detected access point names by deleting all access point names from the set.

The determining of the at least one second sensor and the extent of resolution lowering needed in the at least one second sensor may be performed in mobile 110, or, in some embodiments, a separate device stores the sensor management dataset and performs these determinations as a response to being provided a copy of the instruction to limit the accuracy of the first sensor. This separate device, such as a server, may then advise mobile 110 concerning the extent of resolution lowering in the at least one second sensor.

The sensor management dataset may be determined by the manufacturer of mobile 110, for example, and stored in mobile 110 in connection with manufacture. The manufacturer may obtain the contents of the sensor management dataset by performing automated test series, for example, as is known in the art. Alternatively, this dataset may be determined using an optimization process in mobile 110 or another device, performing the sensor resolution limitation process disclosed herein. The optimization process may employ a machine learning process. In detail, such an optimization process may be run on a training dataset comprising sensor data values from the second sensors, where a target of the optimization process is the sensor data value measured by the first sensor measuring the property that the first sensor is the primary sensor for. In such a case, the optimization process is a regression task. Machine learning algorithms may be applied to the regression task, wherein machine learning algorithms may be based on regression trees, boosted regression trees, and/or convolutional neural networks, for example.

In some embodiments, mobile 110 is configured to generate or modify the sensor management dataset dynamically as a response to the instruction to limit the accuracy of the first sensor. At least some such embodiments are described in connection with FIG. 2.

Figure 2:
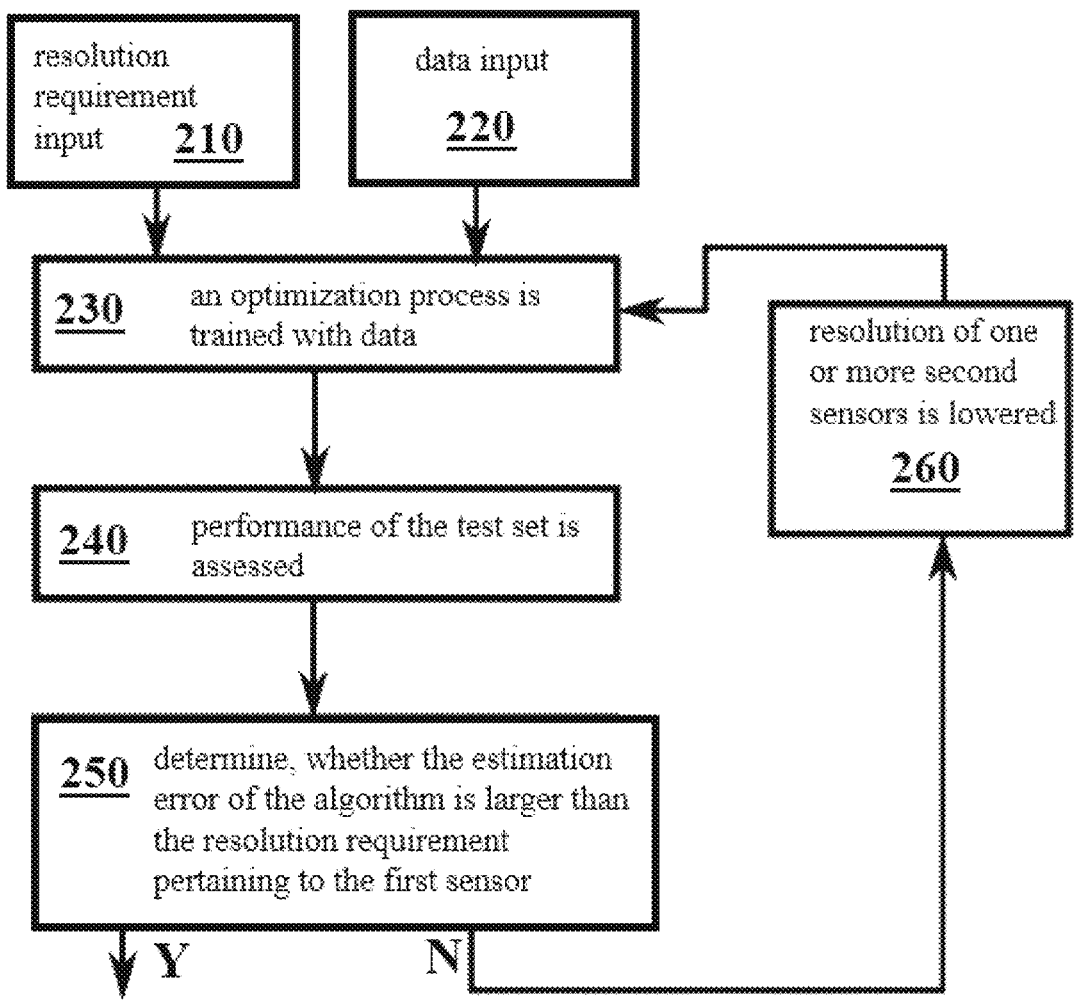
FIG. 2 illustrates a process in accordance with at least some embodiments of the present invention.

FIG. 2 illustrates a process in accordance with at least some embodiments of the present invention. The illustrated process may be performed by mobile 110, for example. The process takes as input a resolution requirement 210 applying to the first sensor, setting a resolution limit to sensor data to be produced by the first sensor. A further input is data 220, which characterizes physical performance capabilities of sensors comprised in mobile 110. Data 220 may be provided in advance by the manufacturer of the device, for example by storing it in the device in connection with manufacturer.

In phase 230, an optimization process, such as a machine learning process, is trained with data 220. In detail, the process is trained to estimate the property primarily measured by the first sensor based on output of the at least one second sensor. For this purpose, the data 220 may be split into a training set and a test set. The training of phase 230 is to take place using the training set, and evaluation is to be performed using the test set, which the optimization process has not seen yet during training.

In phase 240, the performance of the test set is assessed. In phase 250, it is determined, whether the estimation error of the algorithm is larger than the resolution requirement pertaining to the first sensor. If this is the case, labelled "Y", the process ends and the resolution(s) of the second sensor(s) is lowered in accordance with the parameters in use.

On the other hand if this is not the case, labelled "N", the process advances to phase 260, where the resolution of one or more second sensor is lowered, for example by adding noise to its output or quantizing its output. Subsequently, the process reverts to phase 230, as is illustrated in FIG. 2. Once a suitable level, or levels, of resolution lowering for the second sensors is determined, this level, or levels, are taken into use in the actual second sensor(s). Several machine learning algorithms may be used. At least 2-3 machine learning algorithms may be used, for example. Examples of such algorithms include boosted regression trees, such as XGBoost, deep neural networks, such as convolutional neural networks, and nearest neighbour regression. If these algorithms fail to estimate the primary sensor property within the allowed residual resolution, it is not very likely that the secondary sensor measurements will reveal too much information, to some margin. Additionally, one may also include measures from statistics or information theory.

In the case of synthetic sensors, the sensor output is the occurrence of a particular event. For instance, a synthetic sensor may measure if the user is home or that the user has turned on a tap in the house, or the afore-mentioned lightning strike. Such sensors can be handled also and in such case the target in the dataset of FIG. 2 is a binary variable indicating the occurrence of the event. Instead of a regression task, the machine learning task in the synthetic-sensor case is a classification task.

The following table is an example data set, which mobile 110 may create to estimate a second sensor property:

| c1 | c2 | c3 | c4 | Target |
|---|---|---|---|---|
| 0.20 | 0.60 | 0.30 | home_net | (10.4, 10.3) |
| 0.21 | 0.51 | 0.32 | home_net | (10.1, 10.2) |

-continued

| c1 | c2 | c3 | c4 | Target |
|---|---|---|---|---|
| (...) 0.19 | (...) 0.31 | (...) 0.22 | (...) office_net | (...) (9.1, 10.4) |

The dataset of the table has four columns that correspond to the measurements of the second sensors. Furthermore, the dataset also has a column (target) for the primary sensor measurement of the first sensor, satellite positioning location. Each row corresponds to a set of second sensor measurement together with a primary sensor measurement taken at a certain time instance. Note that the dataset in the table may have one or multiple columns that correspond to non-numerical variables or categorical variables. There are several known ways to deal with such variables.

Figure 3:
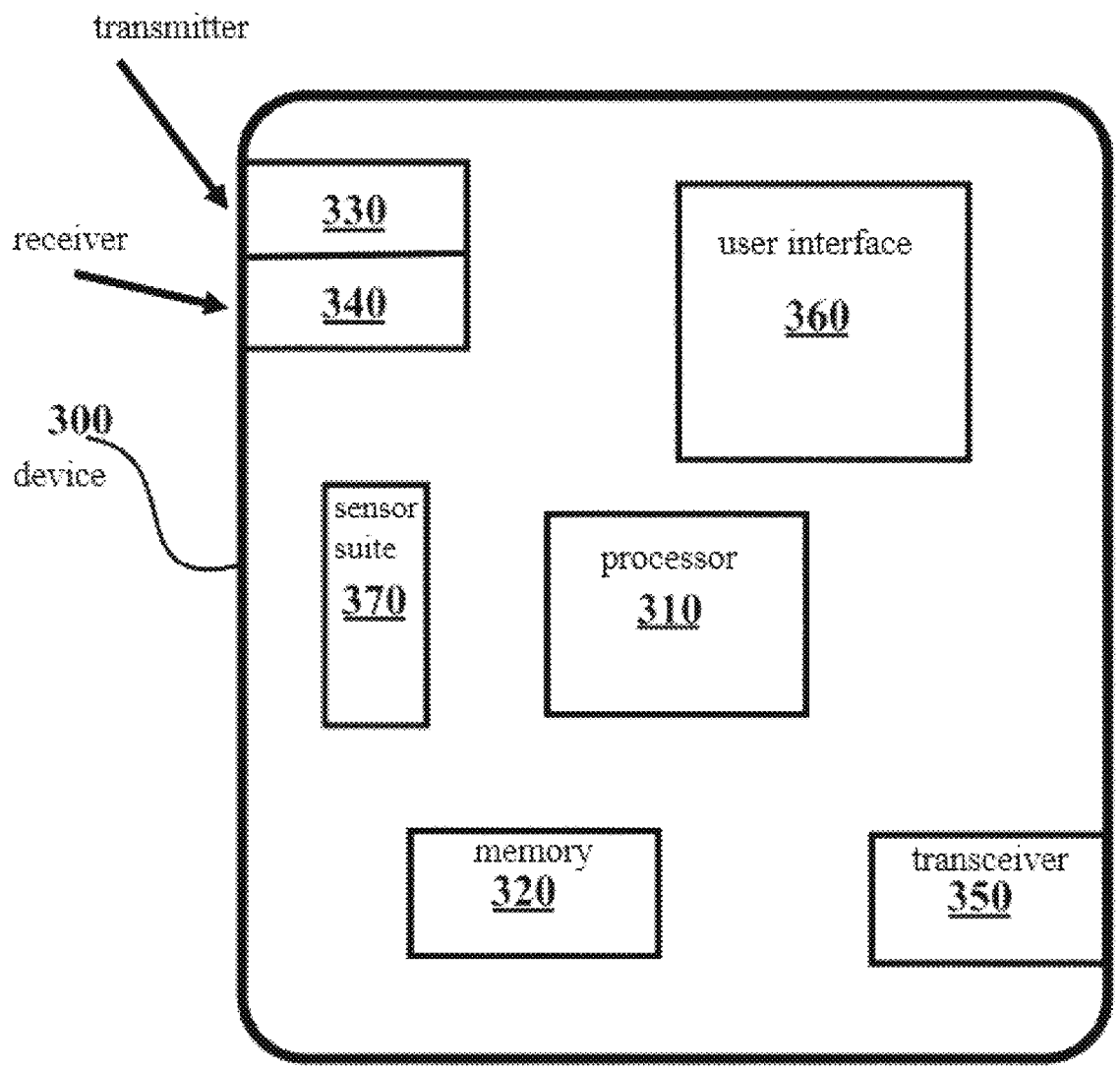
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device such as mobile 110 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300, such as storing, determining and causing lowering, for example. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise sensor suite 370. Sensor suite 370 may comprise plural sensors which are disposed in device 300. Such sensors may include, as discussed herein above, at least one or at least two of an acceleration sensor, a gyroscope, a camera, a satellite positioning receiver, a microphone, a wireless local area radio transceiver and/or other sensors, depending on the specific embodiment.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350.

Processor 310, memory 320, transmitter 330, receiver 340, NFC transceiver 350, UI 360 and/or sensor suite 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
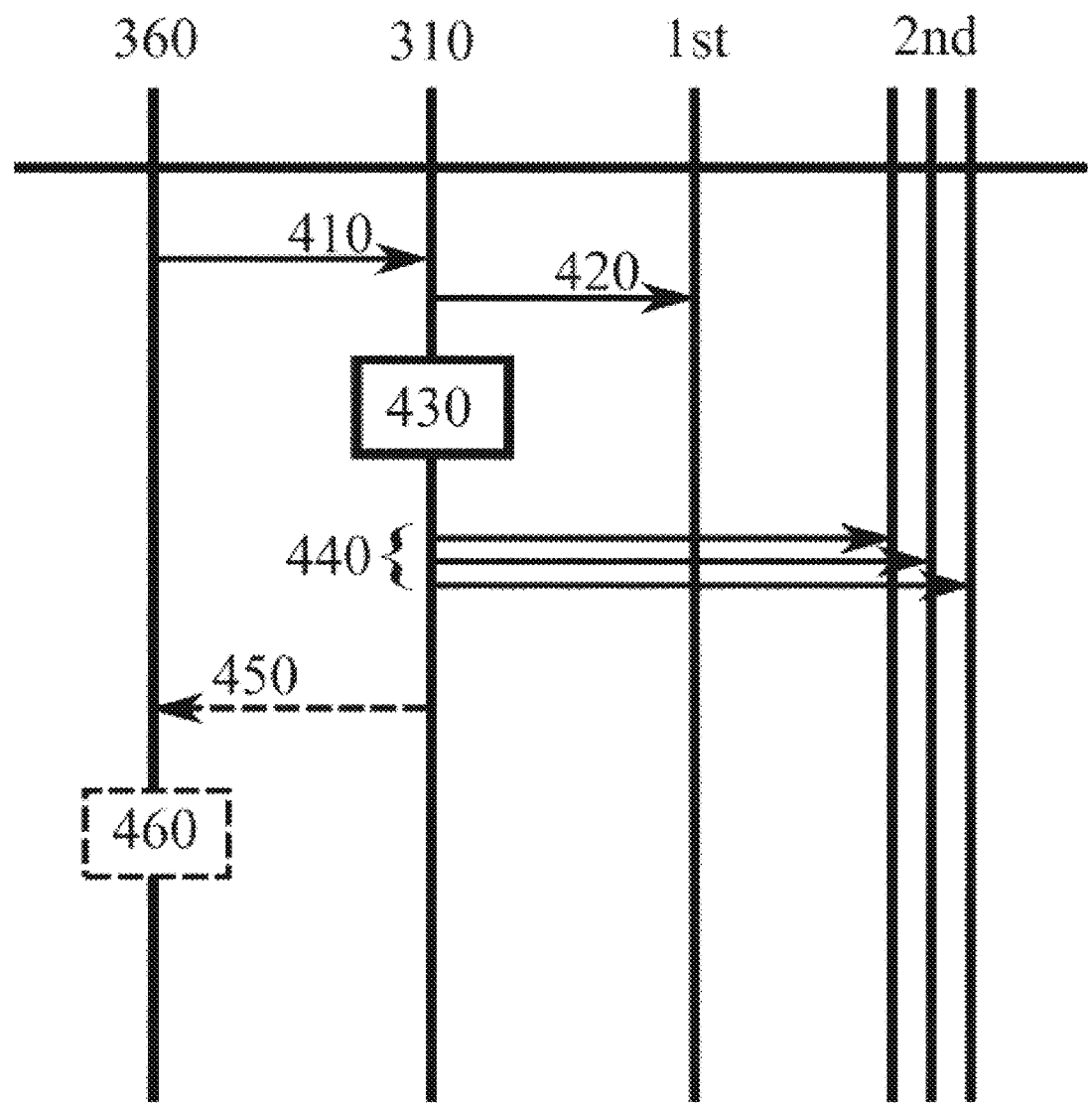
FIG. 4 illustrates signalling in accordance with at least some embodiments of the present invention.

FIG. 4 illustrates signalling in accordance with at least some embodiments of the present invention. On the vertical axes are disposed, from the left UI 360, processor 310, the first sensor "$1^{st}$" and the at least one second sensor, "$2^{nd}$". Time advances from the top toward the bottom.

In phase 410, a user inputs, using UI 360, an instruction to limit an accuracy of the first sensor in accordance with a first resolution requirement, which applies to a property measured by the first sensor. In phase 420, responsively, processor 310 applies the resolution requirement to the first sensor. This may comprise processor 310 instructing the first sensor to send lower-resolution sensor data to processor 310, or it may be an internal phase of processor 310 to only store sensor data received from the first sensor at the lowered resolution.

Phase 430 comprises determining which sensors of mobile 110 are the second sensor(s), and the extent of resolution lowering to be applied to each second sensor, based on the sensor management dataset, as described herein above. The sensor management dataset may be pre-calculated and stored, or, as described herein above, it may at least in part be dynamically determined as a response to the instruction of phase 410, using an optimization process, which may comprise using at least one machine learning algorithm.

Phases 440 comprise processor 310 applying the lowered resolution requirement(s) to the second sensor(s). As was the case for the first sensor, this may comprise an instruction to the second sensor(s) to send lowered-resolution sensor data, as illustrated, or an internal phase of processor 310 to only store sensor data from the second sensor(s) at the lowered resolution.

Phases 420 on the one and phases 430 and 440 on the other hand may take place in either order, or substantially simultaneously. In optional phase 450, processor 310 indicates to UI 360 that the resolution requirement if the instruction has been applied, wherein the indication may comprise indications concerning lowered resolution in the second sensor(s). In likewise optional phase 460, UI 360 provides the indication of optional phase 450 to the user.

Figure 5:
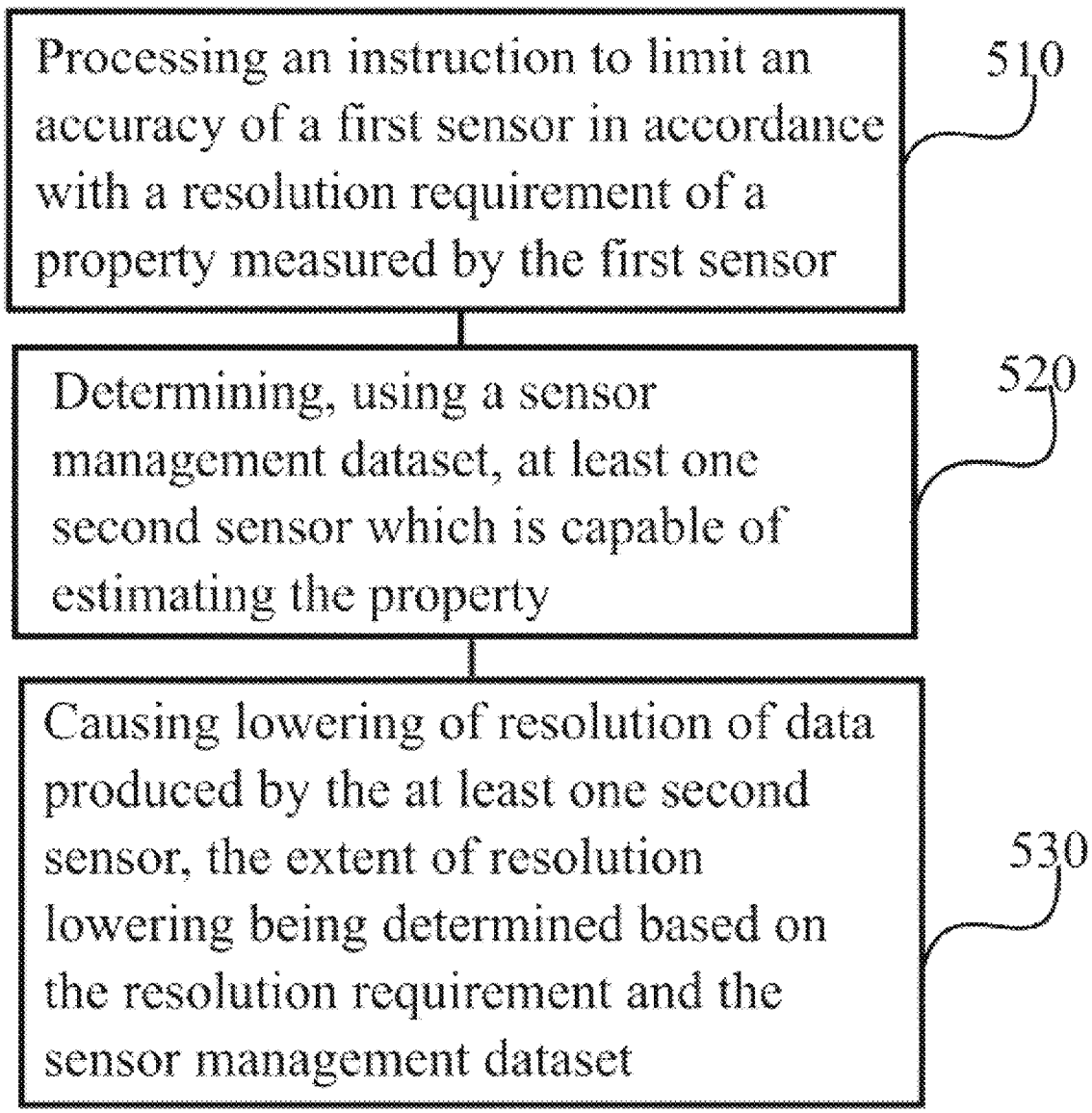
FIG. 5 is a flow graph of a method in accordance with at least some embodiments of the present invention.

FIG. 5 is a flow graph of a method in accordance with at least some embodiments of the present invention. The phases of the illustrated method may be performed in mobile 110, or in a control device configured to control the functioning thereof, when installed therein. Alternatively, the phases of the illustrated method may be performed in a server. When performed in a server, the sensor management dataset need not be handled in mobile 110.

Phase 510 comprises processing an instruction to limit an accuracy of a first sensor in accordance with a resolution requirement of a property measured by the first sensor. Phase 520 comprises determining, using a sensor management dataset, at least one second sensor which is capable of estimating the property. Finally, phase 530 comprises causing lowering of resolution of data produced by the at least one second sensor, the extent of resolution lowering to be applied to each of the at least one second sensor being determined based on the resolution requirement and the sensor management dataset.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in safeguarding user privacy.

ACRONYMS LIST 5G fifth generation
LTE long term evolution
NR new radio
SSID service set identity
UI user interface
WLAN wireless local area network

| REFERENCE SIGNS LIST | |
|---|---|
| 110 | device/mobile |
| 120 | base node |
| 130 | network node |
| 140, 150 | access point |
| 160 | satellite |
| 112 | wireless link |
| 123 | connection |
| 210-260 | phases of the method of FIG. 2 |
| 300-370 | structure of the device of FIG. 3 |
| 410-460 | phases of the method of FIG. 4 |
| 510-530 | phases of the method of FIG. 5 |

The invention claimed is:

1. An apparatus comprising:
at least one processor; and
at least one memory including instructions, the at least one memory and the instructions configured to, with the at least one processor, cause the apparatus to perform at least the following:
process an instruction to limit an accuracy of a first sensor in accordance with a resolution requirement of a property measured by the first sensor;
determine, using a sensor management dataset, at least one second sensor which is capable of estimating the property from among a set of second sensors, and
cause lowering of resolution of data produced by the at least one second sensor, an extent of the resolution lowering being determined based on the resolution requirement and the sensor management dataset.

2. The apparatus according to claim 1, wherein the apparatus further comprises the first sensor and the at least one second sensor.

3. The apparatus according to claim 1, wherein the first sensor comprises a sensor enabled to determine location.

4. The apparatus according to claim 3, wherein the first sensor comprises a satellite positioning receiver.

5. The apparatus according to claim 3, wherein the at least one second sensor comprises at least one of the following: an acceleration sensor, a gyroscope or a wireless local area network receiver.

6. The apparatus according to claim 1, wherein the apparatus is further caused to perform the lowering of the resolution by causing at least one of: quantization of the data produced by the at least one second sensor, or adding noise to the data produced by the at least one second sensor.

7. The apparatus according to claim 1, wherein the at least one second sensor comprises a wireless local area network receiver, and wherein the apparatus is further caused to perform the lowering of the resolution by adding access point names not detected to a list of access point names detected by the wireless local area network receiver.

8. The apparatus according to claim 1, wherein the at least one second sensor comprises a wireless local area network receiver, and wherein the apparatus is further caused to perform the lowering of resolution by deleting all access point names from a list of access point names detected by the wireless local area network receiver.

9. The apparatus according to claim 1, wherein the apparatus is further caused to perform determination of the sensor management dataset by using at least one machine learning algorithm.

10. The apparatus according to claim 9, wherein the at least one machine learning algorithm comprises at least one of the following: a boosted regression tree, a convolutional neural network or a nearest neighbor regression algorithm.

11. A method comprising:
processing an instruction to limit an accuracy of a first sensor in accordance with a resolution requirement of a property measured by the first sensor;
determining, using a sensor management dataset, at least one second sensor which is capable of estimating the property from among a set of second sensors, and
causing lowering of resolution of data produced by the at least one second sensor, an extent of the resolution lowering being determined based on the resolution requirement and the sensor management dataset.

12. The method according to claim 11, wherein the first sensor comprises a sensor enabled to determine location.

13. The method according to claim 11, wherein the at least one second sensor comprises at least one of the following: an acceleration sensor, a gyroscope or a wireless local area network receiver.

14. The method according to claim 11, wherein the apparatus is further configured to cause the lowering of the resolution by causing at least one of: quantization of the data produced by the at least one second sensor, or adding noise to the data produced by the at least one second sensor.

15. The method according to claim 11, wherein the at least one second sensor comprises a wireless local area network receiver, and wherein the lowering of the resolution is performed by adding access point names not detected to a list of access point names detected by the wireless local area network receiver.

16. The method according to claim 11, wherein the al least one second sensor comprises a wireless local area network receiver, and wherein the lowering of the resolution is performed by deleting all access point names from a list of access point names detected by the wireless local area network receiver.

17. The method according to claim 11, wherein the determining of the sensor management dataset is performed by using at least one machine learning algorithm.

18. The method according to claim 17, wherein the at least one machine learning algorithm comprises at least one of the following: a boosted regression tree, a convolutional neural network or a nearest neighbor regression algorithm.

19. A non-transitory computer readable medium having stored thereon a set of computer readable instructions that, when executed by at least one processor, cause an apparatus to perform at least:
- process an instruction to limit an accuracy of a first sensor in accordance with a resolution requirement of a property measured by the first sensor;
- determine, using a sensor management dataset, at least one second sensor which is capable of estimating the property from among a set of second sensors, and
- cause lowering of resolution of data produced by the at least one second sensor, an extent of the resolution lowering being determined based on the resolution requirement and the sensor management dataset.

* * * * *